Dec. 25, 1951 V. J. TERRY ET AL 2,579,524

MODULATOR FOR CARRIER TELEGRAPH SYSTEMS

Filed Sept. 9, 1949

INVENTORS
VICTOR J. TERRY
THOMAS F. S. HARGREAVES
BY Percy P. Lantzy
ATTORNEY

Patented Dec. 25, 1951 2,579,524

UNITED STATES PATENT OFFICE 2,579,524

MODULATOR FOR CARRIER TELEGRAPH SYSTEMS

Victor John Terry and Thomas Frederick Stanley Hargreaves, London, England, assignors to International Standard Electric Corporation Application September 9, 1949, Serial No. 114,804
In Great Britain September 10, 1948

5 Claims. (Cl. 332—37)

The present invention relates to signal modulators for electric carrier telegraph systems.

In such systems, the modulating signals are frequently of the double current type, that is, they consist of alternations of voltage or current between a positive value and an equal negative value. Ideally, the change from the positive to the negative value (and vice versa) should be instantaneous, and this requirement is substantially met by the usual telegraph transmitter. However, when the signals have to be transmitted over a long line to the telegraph modulator, they may arrive seriously distorted, so that the changes between the positive and negative values take place relatively slowly instead of instantaneously.

It is found that for this reason a corresponding distortion is very liable to be produced in the modulator.

It is the principal object of the invention, therefore, to prevent the distortion suffered by the signals after transmission over a long line from producing distortion in the modulator.

This object is achieved according to the invention by providing a signal modulating arrangement for a carrier telegraph system, comprising a balanced modulator with a symmetrical response characteristic and adapted to produce carrier waves of opposite phase for positive and negative modulating signals, respectively, and of equal maximum amplitudies a carrier wave source for the said modulator, means for deriving from the said source an auxiliary carrier wave having a constant amplitude equal to the said maximum amplitude, and means for combining the auxiliary wave with the modulated wave obtained from the output of the modulator.

The invention will be described with reference to the accompanying drawing in which.

When the double current telegraph signals are distorted after passage through a long line, it is generally found that the intervals between the instants at which the signal voltage or current passes through the zero value are substantially equal to the intervals between the undistorted signals. Accordingly, if the changes in the amplitude of the modulated carrier wave can be made to take place at these particular instants, the distortion introduced by the long line can be made to have practically no effect. In general, however, if the distorted signals are applied to an amplitude modulator, the amplitude changes do not take place at these instants and serious distortion results.

It has, however, been proposed to overcome this difficulty at least in part, by greatly increasing the amplitude of the signals with respect to the amplitude which saturates the modulator, so, that in effect the amplitude changes of the modulating signal within the range of the modulator take place much more steeply, and so the modulation distortion is reduced.

Apart from the fact that the necessity for greatly increasing the signal amplitude is in itself a serious disadvantage, the difficulties of preventing signal components from appearing in the output of the modulator are also seriously increased. Furthermore, improvements in carrier telegraph systems have reduced distortion from other causes, and distortion from the above-described causes, and distortion from the above-described cause has become more important, and this method of reduction is therefore inadequate.

These objections are overcome by a different method according to the present invention.

Figure 1:
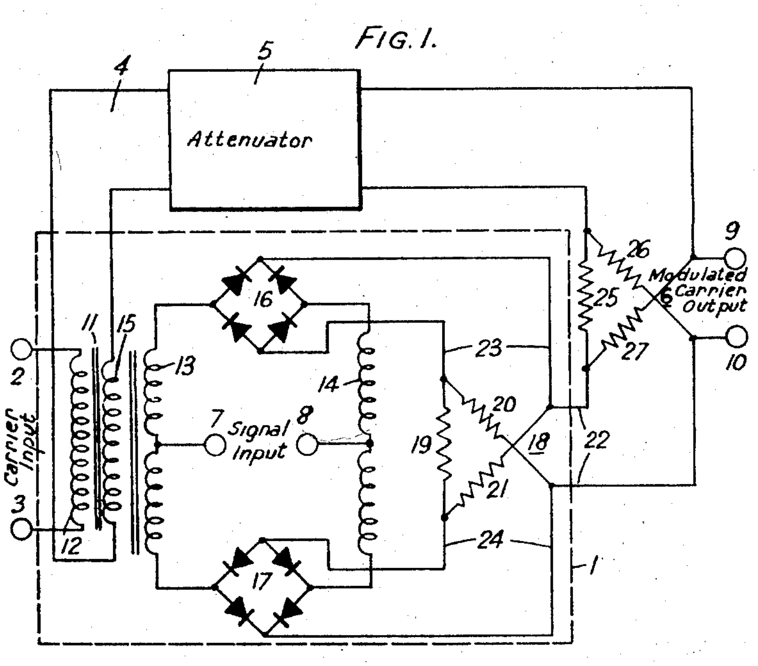
Fig. 1 shows a schematic circuit diagram of a preferred embodiment of the invention.

In the embodiment shown in Fig. 1, a balanced modulator 1 included in a dotted outline is supplied from a carrier wave source (not shown) connected to terminals 2 and 3. An auxiliary carrier wave of constant amplitude is derived from the said source and is supplied over a separate path 4 containing an attentuator 5 and is combined in a network 6 with the carrier waves from the output of the modulator 1, which are modulated by the signals applied to terminals 7 and 8. The modulated carrier waves substantially free from distortion are then obtained from the output terminals 9 and 10.

It has already been explained that the modulating signals are of the double current type. It is required that the output carrier waves should have a fixed amplitude A for signals of one sign and zero amplitude for signals of the other sign, and the change between the values zero and A should ideally take place suddenly when the modulating signal amplitude passes through zero. In practice, of course, the last condition can only be approximated, but it has been found that the distortion introduced is negligible if the modulating arrangement has a linear response characteristic between the saturation limits, and if it is arranged so that, the carrier output amplitude A/2 occurs when the modulating signal amplitude is zero. This can be more easily understood from Fig. 2, which shows the graph of the response characteristic desired for the modulating arrangement according to the invention. In this graph the abscissae are applied signal voltages, and the ordinates are the resulting carrier output amplitude.

The saturation limits of the modulating arrangement correspond to the amplitudes zero and A. The arrangements should be such that when the signal voltage is zero, the carrier output amplitude is A/2 which occurs when the characteristic curve crosses the vertical axis. The signal amplitude should be such that for the values ±V the modulating arrangement is taken just beyond the saturation points, as indicated.

Figure 2:
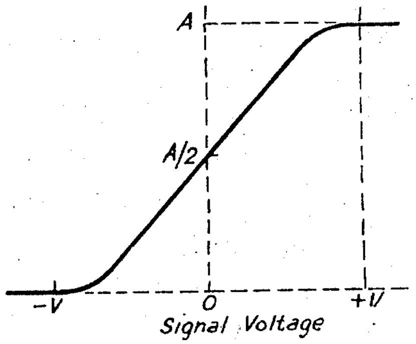
Fig. 2 shows a characteristic curve used to explain the operation of the embodiment.

In order to obtain the characteristic shown in Fig. 2, with the arrangements of Fig. 1, the modulator 1 should be a balanced symmetrical phase modulator of the kind which produces output carrier waves of maximum amplitude A/2 for positive modulating signals and waves of the same amplitude A/2 but of opposite phase for negative signals. The attenuator 5 should be adapted to produce carrier waves directly from the source connected to terminals 2 and 3, of amplitude A/2 which should be also in the same phase as the waves at the output of the modulator 1 for positive signals. If necessary, suitable phase adjusting means (not shown) may be included in the path 4. Then it will be clear that the combined amplitude at terminals 9 and 10 for positive signals will be A, and also the combined output amplitude will be zero for negative signals. When the modulating signal is of zero amplitude, the output of the balanced modulator 1 will be zero, and so the carrier output at terminals 9 and 10 will be A/2 and will be derived solely from the path 4.

It will be obvious that by reversing the connections of the output of the attenuator 5, the arrangement will give a zero output for positive signals and an output amplitude A for negative signals.

The modulator 1 of Fig. 1 is of conventional type except for a minor variation, and consists of an input transformer 11, of the balanced hybrid coil type including a primary winding 12, connected to terminals 2 and 3, two centre-tapped secondary windings 13 and 14 and a tertiary winding 15, which is conveniently employed for deriving the auxiliary carrier wave for path 4 and is connected to the input of the attenuator 5. The signal input terminals 7 and 8 are connected respectively to the centre taps of the windings 13 and 14 and corresponding terminals of these windings are connected by two bridge rectifiers 16 and 17. The windings 13 and 14 should be poled to provide a series-aiding connection around the closed loop.

The output terminals of the bridge rectifiers 16 and 17 are connected by a network 18 consisting of three equal resistances 19, 20 and 21, which, with the output circuit 22, and the two input circuits 23 and 24, form a balanced bridge system, permitting the waves from circuits 23 and 24 to be combined in 22, without mutual reaction.

The output of the attenuator 5 is combined with the output from the modulator of 1 by means of another similar balanced bridge system 6 including three equal resistances 25, 26 and 27, the output of which is connected to terminals 9 and 10.

The circuit impedances should be designed so that each of the circuits connected to the networks 6 and 18 presents an impedance which is substantially a pure resistance R, and all the resistances 19, 20 and 21 and 25, 26 and 27 should be equal to R. The attenuator 5 may consist of a network of a resistance of any conventional form and may be adjustable if desired.

The modulator 1 will be recognized as a known form of telegraph phase modulator in which the usual hybrid coil output transformer has been replaced by the balanced bridge system of resistances 19, 20 and 21, which produces rather more constant input impedances at terminals 2, 3 and 7 and 8. If desired,, however, the network 18 may be replaced by the conventional hybrid coil arrangement shown in Fig. 3. A transformer 28 has two centre tapped primary windings 29 and 30, connected to the circuits 23 and 24 as shown, and a secondary winding 31 connected to the circuit 22. The centre taps of the two primary windings are connected by a resistance 32 which balances the circuit 22.

The network 6 of Fig. 1 may also be replaced by a similar arrangement if desired.

It is not essential that the phase modulator 1 should take the identical form shown in Fig. 1.

While it is desirable that the modulator should have a linear response characteristic like that shown in Fig. 2, it should be noted that satisfactory results could also be obtained with a phase modulator having a characteristic which is not absolutely linear, but which has opposite quadrant symmetry about the point where it cuts the zero ordinate. Thus, any type of balanced phase modulator having a characteristic with this type of symmetry may be used. For the purposes of this specification such a characteristic will be called "a symmetrical response characteristic."

Furthermore, the auxiliary carrier wave could be derived from the carrier wave source in other ways than by means of a tertiary winding on the input transformer of the modulator.

Figure 3:
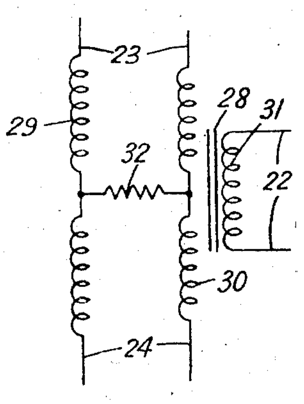
Fig. 3 shows a minor modification of Fig. 1.

It may be pointed out that the resistance networks 6 and 18 are simplified versions of the resistance hybrid coil networks shown in Fig. 3 of the article by P. G. Edwards entitled "V1 Telephone Repeater Arrangement" in the "Bell Laboratories Record," September 1941, page 20. In the case of the networks 6 and 18, a direct current component remains in the output and will be removed by a subsequent filter or transformer (not shown). The more complicated network described in the above-quoted article eliminates this direct current component, and could be used instead of the network 6 and 18 if desired.

While the principles of the invention have been described above in connection with specific embodiments and particular modifications thereof, it is to be clearly understood that this description is made only by way of example and not as a limitation on the scope of the invention.

What is claimed is:

1. A signal modulating arrangement for a carrier telegraph system, comprising a balanced modulator with a symmetrical response characteristic, and adapted to produce carrier waves of opposite phase for positive and negative modulating signals respectively, and of equal maximum amplitude, a carrier wave source for the said modulator, means for deriving from the said source an auxiliary carrier wave having a constant amplitude equal to the said maximum amplitude, and means for combining the auxiliary wave with the modulated wave obtained from the output of the machine.

2. An arrangement according to claim 1 in which said modulator further comprises an input transformer having two centre tapped secondary windings, a pair of similar bridge rectifiers, said windings connected to said rectifiers, means for connecting the said source to the primary winding of the said transformer, and means for combining the outputs of said rectifiers.

3. An arrangement according to claim 2 in which said modulator further comprises an input transformer having a tertiary winding, the auxiliary carrier wave being derived from said tertiary winding.

4. An arrangement according to claim 3 further comprising an attenuator, said tertiary winding being connected to the first mentioned combining means through said attenuator.

5. An arrangement according to claim 4 in which said combining means comprises three equal resistances forming a balanced bridge system with the circuit to which they are connected.

VICTOR JOHN TERRY.
THOMAS FREDERICK STANLEY HARGREAVES.

No references cited.